Patented June 6, 1950

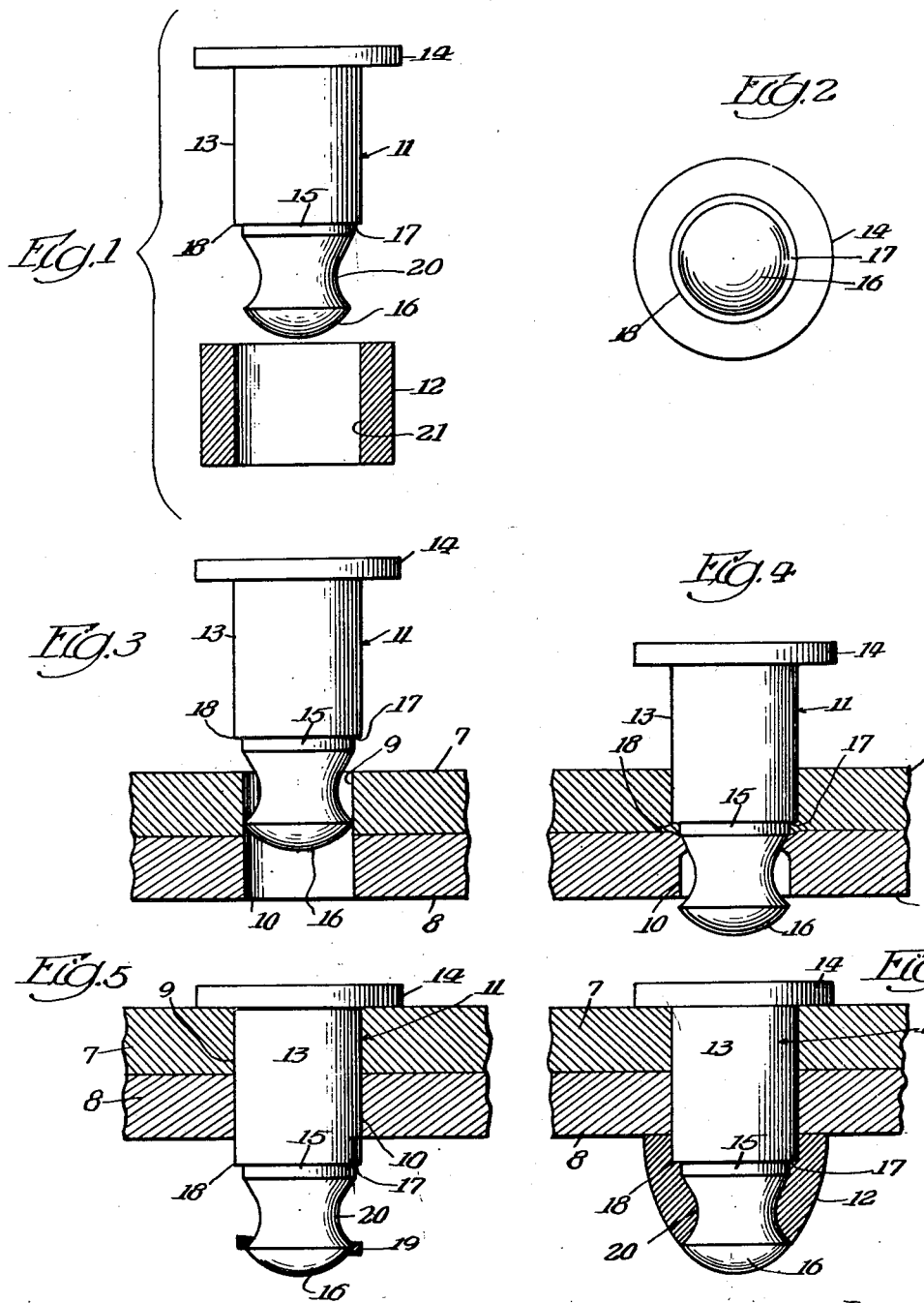

2,510,076

UNITED STATES PATENT OFFICE 2,510,076

SELF-BROACHING RIVET

William S. Cockrell, San Diego, Calif., assignor to Consolidated Vultee Aircraft Corporation, San Diego, Calif., a corporation of Delaware Application July 26, 1945, Serial No. 607,174

1 Claim. (Cl. 85—37)

The present invention relates generally to rivets. More particularly the invention relates to that type of rivet which is known as a high shear rivet, serves as a medium or instrumentality for securing together a pair of abutting plates with registering circular holes therein, and as its parts or components comprises: (1) a one piece hard metal rivet pin in the form of a substantially cylindrical shank which is adapted to extend through and fit snugly through the holes in the two plates and has at one end thereof an enlarged head for abutment adjacent the outer face of one of the plates and at its other end an exposed stem with a circumferential groove therein; and (2) a separately formed malleable collar which is adapted to be contracted around the stem into interfitting or seated relation with the circumferential groove and to have one end thereof abut against the outer face of the other plate.

In a conventional or standard rivet of this type the inner or root end of the circumferentially grooved stem of the rivet pin is inwardly flared and joins and merges into the adjacent end of the shank. Such a rivet has been found in practice to be objectionable for the reason if the holes in the two plates are pronouncedly undersized or tapered as is generally the case the shank of the pin when driven through the two holes sets up internal stresses in the portions of the plates that define the holes and in some instances causes deflection, distortion or rupture of such portions.

The primary object of this invention is to provide a rivet of the type under consideration which is an improvement upon, and eliminates the defects of, standard or conventional rivets by reason of the fact that the end of the shank that has the circumferentially grooved stem for the malleable collar embodies an annular shoulder the outer portion of which forms a circular cutting edge which when the shank is driven through the holes in the two plates broaches or reams the hole defining portions of the plates to the end that the shank of the pin fits snugly within such portions and neither sets up objectionable internal stresses in the plates nor deflects, distorts or ruptures the plates.

Another object of the invention is to provide a rivet of the character last mentioned in which the annular shoulder on the stem carrying end of the shank of the pin is flat, extends at true right angles to the axis of the shank, and is formed by providing such end with an annular groove which results in the stem and shank being connected together by a neck of reduced diameter.

A further object of the invention is to provide a rivet of the type and character under consideration in which the outer end of the stem is the same in diameter as the neck between the stem and the shank of the pin and serves to pilot the shank when the latter is driven through the holes in the plates.

A still further object of the invention is to provide a rivet of the rivet pin and malleable collar variety which is generally of new and improved construction and efficiently and effectively fulfills its intended purpose.

Other objects of the invention and the various advantages and characteristics of the present rivet will be apparent from a consideration of the following detailed description.

The invention consists in the several novel features which are hereinafter set forth and are more particularly defined by the claim at the conclusion hereof.

In the drawing which accompanies and forms a part of this disclosure or specification in which like numerals of reference denote corresponding parts throughout the several views:

Figure 1 is a side elevation of a rivet embodying the invention;

Figure 2 is an end view showing the stem equipped end of the rivet pin before application of the malleable collar;

Figure 3 is a side view showing the rivet pin after the circumferentially grooved stem has been inserted part way through one of a pair of abutting plates with registering holes therein and illustrating in detail the manner in which the stem functions as a pilot for the shank of the pin;

Figure 4 is a side view showing the pin after the shank thereon has been driven part way through the two plates and illustrating in detail the manner in which the outer portion of the annular shoulder on the stem carrying end of the shank serves to broach or ream the hole defining portions of the plates;

Figure 5 is a side view showing the rivet pin after it has been driven completely through the holes in the two plates; and Figure 6 is a side view showing the rivet pin after the malleable collar has been contracted around the stem into interfitting or seated relation with the circumferential groove.

The rivet which is shown in the drawing constitutes the preferred form or embodiment of the invention and is illustrated in connection with a pair of abutting metallic plates 7 and 8 with registering cylindrical holes 9 and 10 therein. It serves to secure the two plates together and, as its parts, comprises a rivet pin 11 and a collar 12. As shown in the drawing the holes 9 and 10 in the plates 7 and 8 are substantially the same in diameter.

The rivet pin 11 is formed of steel or any other suitable metal that is harder than the plates 7 and 8. It is of one piece design or construction and consists of a shank 13, an enlarged head 14 on one end of the shank, a neck 15 on the other end of the shank, and a stem 16 on the neck. The shank 13 is cylindrical and is adapted to be driven through the registering holes 9 and 10 in the two plates. It is of slightly greater diameter than the holes in order that it fits snugly within the holes after it has been driven therethrough. The length of the shank is in excess of the combined length of the holes 9 and 10. In mounting the rivet pin with respect to the plates 7 and 8 the shank is driven through the holes until the head 14 is brought into abutment with the outer face of the plate 7 as shown in Figures 5 and 6. The head may be of desired shape or contour. For example, it may be disc-like in conformation as shown in the drawing or it may be either rounded or of the tapered variety. The end of the shank which carries the neck 15 is provided with a flat annular shoulder 17. This shoulder extends at true right angles to the axis of the shank. The outer portion of the shoulder 17 forms a sharp circular cutting edge 18 which when the shank is driven through the holes 9 and 10 in the plates 7 and 8 broaches or reams the hole-defining portions of the plates with the result that the shank of the pin fits snugly within such portions and neither sets up objectionable internal stresses in the plates or deflects, distorts or ruptures the plates. In connection with driving of the shank 13 through the holes in the plates the cutting edge 18 shaves or shears the hole defining portions of the plates as shown in Figure 4. The metal which is shaved or sheared by the cutting edge 18 from the hole-defining portions of the plates usually assumes the form of a ringlet 19 which after the shank has been driven completely through the holes 9 and 10 encircles or surrounds the stem 16 (see Figure 5). It is contemplated that as soon as the shank of the rivet pin has been been driven completely though the holes in the two plates the ringlet 19 will be removed manually from the shank preparatory to application of the malleable collar 12 to the stem 16. By reason of the fact that the cutting edge 18 at the outer portion of the annular shoulder 18 broaches or reams the holes 9 and 10 during driving of the shank therethrough the shank fits snugly within the holes and is firmly supported throughout the entire area of the surfaces of the plates that define the holes. Because of the broaching or reaming action of the cuting edge 18 there is no scoring of the shank when the latter is driven through the holes 9 and 10. The neck 15 of the rivet pin 11 is cylindrical. It is arranged in centered relation with the shank 13 and is of slightly less diameter than the shank. The annular shoulder 17 and the reduced neck 15 are formed by providing the stem carrying end of the shank with an annular groove. The stem 16 has a rounded or dome-shaped outer end and embodies a shallow circumferential groove of arcuate cross section 20. The latter extends from the reduced neck 15 to the outer end of the stem 16 and is adapted to have the collar 12 contracted into interfitting or seated relation with it. The rounded or dome-shaped outer end of the stem 16 is the same in diameter as the reduced neck 15 and serves as a pilot for the shank when the latter is driven through the holes 9 and 10 in the plates 7 and 8. As shown in the drawing the stem is approximately as long as its outer end is wide. By reason of the fact that the stem has the groove 20 the portion of the stem directly inwards of the outer end is outwardly flared and hence in connection with removal of the ringlet 19 serves to center the ringlet with respect to the outer end of the stem and guide it to said outer end. When the rivet pin is in its operative position the stem 16 is disposed outwards of or beyond the outer face of the plate 8, as shown in Figures 5 and 6.

The collar 12 is formed of any suitable soft or malleable metal and has a cylindrical longitudinally extending bore 21. The diameter of this bore is slightly larger than the diameter of the outer end of the stem 16. After the rivet pin 11 is driven into place the malleable collar 12 is sleeved over the stem 16 and then is contracted by a suitable tool (not shown) into a position wherein it is in interfitting or seated relation with the groove 20 and its inner end is in abutment with the outer face of the plate 8.

When it is desired to use the rivet the stem 16 is first inserted into the outer end of the hole 9 in the plate 7. Thereafter the rivet pin is driven into place by applying pressure or a driving force to the enlarged head 14. As the shank of the rivet pin is driven through the holes 9 and 10 the cutting edge 18 on the outer portion of the annular shoulder 17 broaches or reams the hole defining portions of the two plates as heretofore described. After driving of the rivet pin 11 into place the shaved or sheared metal ringlet 19 is removed from the stem 16 and the malleable collar 12 is contracted around the stem 16 and into seated relation with the groove 20.

The herein described rivet efficiently and effectively fulfills its intended purpose and is characterized by the fact that the cutting edge 18 on the outer portion of the annular shoulder 17 so broaches or reams the hole defining portions of the plates in connection with driving of the rivet pin into place that the shank of the rivet pin fits snugly within the holes in the plates and neither sets up strains or stresses in the plates or causes the plates to become distorted or ruptured. By reason of the fact that the shank of the rivet pin includes the annular shoulder 17 with its cutting edge 18 the rivet pin 11 may be readily driven into its operative position even though the holes in the plates are pronouncedly under-sized or tapered.

The invention is not to be understood as restricted as to the details set forth since these may be modified within the scope of the appended claim without departing from the spirit or scope of the invention.

Having thus described the invention what I claim as new and desire to secure by Letters Patent is:

As a new article of manufacture, a one-piece rivet pin adapted in conjunction with a contractable malleable collar to form a high shear rivet for use in securing together a pair of abutting metallic plates with transverse, circular, registering holes therethrough, formed of harder metal than the plates and comprising a cylindrical shank of slightly greater diameter than the holes in the plates, adapted to be driven through the holes, embodying at one end thereof an enlarged head with a truly flat inner surface for abutment against the outer face of one of the plates, and provided at its other end with an annular groove forming a reduced cylindrical neck and in addition a flat circular shoulder extending at right angles to the axis of the shank and having its outer portion forming a sharp circular cutting edge for broaching or reaming the hole defining portions of the plates when the shank is driven through the holes, and a reduced stem of circular cross section connected concentrically to said neck, provided with a shallow, substantially full length, circumferential, collar receiving groove of arcuate cross section, having the inner end thereof of the same diameter as the neck and having its outer end of the same diameter as the neck and shaped to form a pilot for the shank during drive of the latter through the holes, said shank being of greater length than the combined length of the holes in order that when it is driven through the holes until arrested by abutment of the inner surface of the head against the outer surface of said one plate the aforesaid cutting edge traverses and serves to broach or ream all portions of the hole defining portions of the plates and then is disposed outwards of the outer face of the other plate, said stem being approximately as long as its outer end is wide and having the portion thereof directly inwards of its said outer end outwardly flared in order that it serves to center with respect to the outer end of the stem the free metal resulting from the broaching or reaming action of the cutting edge and also to guide such free metal to said outer end of the stem for removal from said stem.

WILLIAM S. COCKRELL.

REFERENCES CITED

The following references are of record in the file of this patent:

UNITED STATES PATENTS

| Number | Name | Date |
|---|---|---|
| 968,551 | Goss | Aug. 30, 1910 |
| 2,355,579 | Wing | Aug. 8, 1944 |
| 2,358,728 | Miller | Sept. 19, 1944 |